United States Patent Office 3,135,942
Patented June 2, 1964

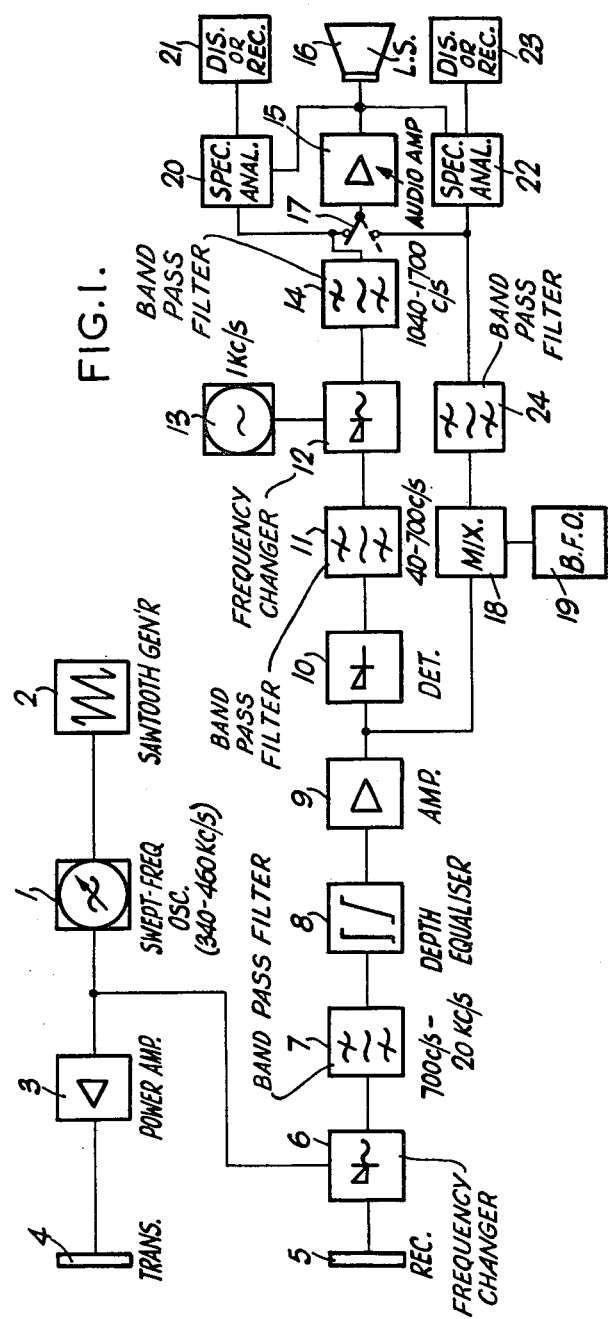

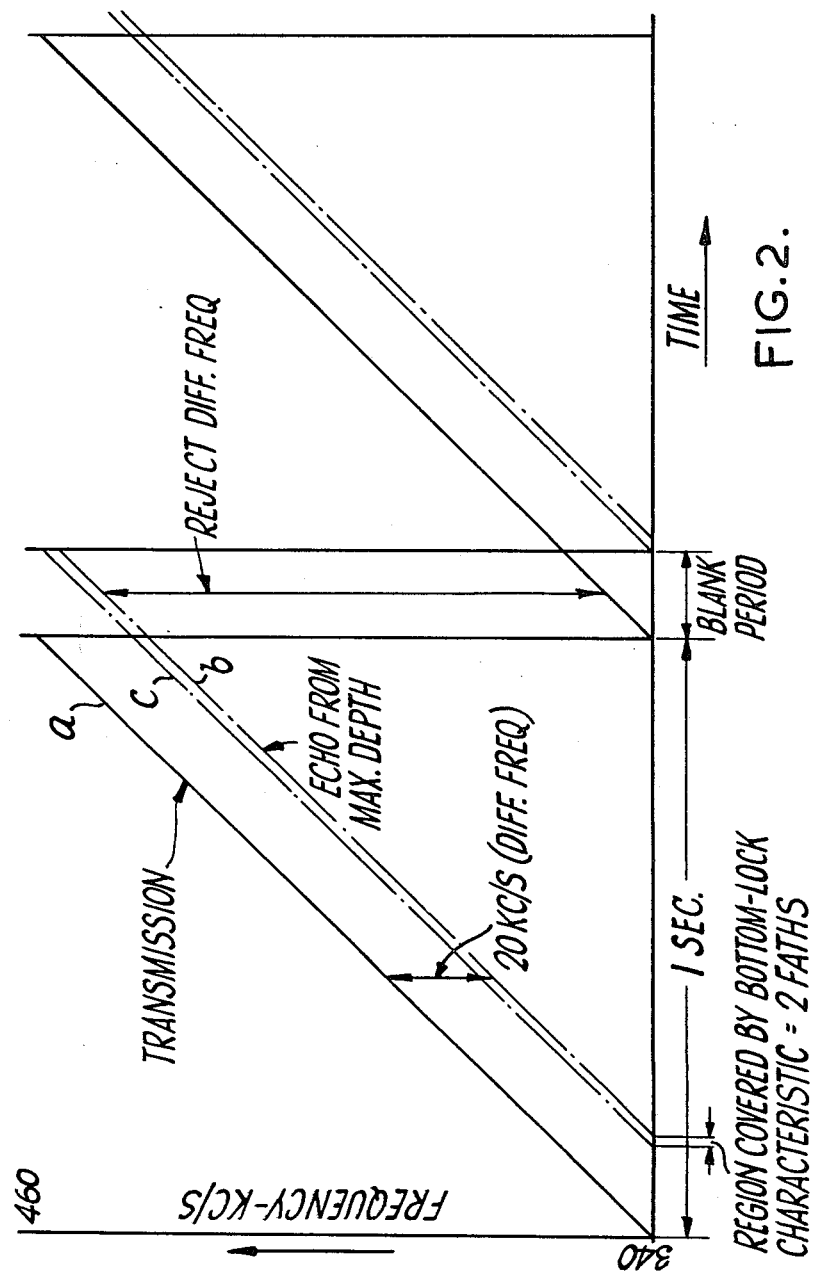

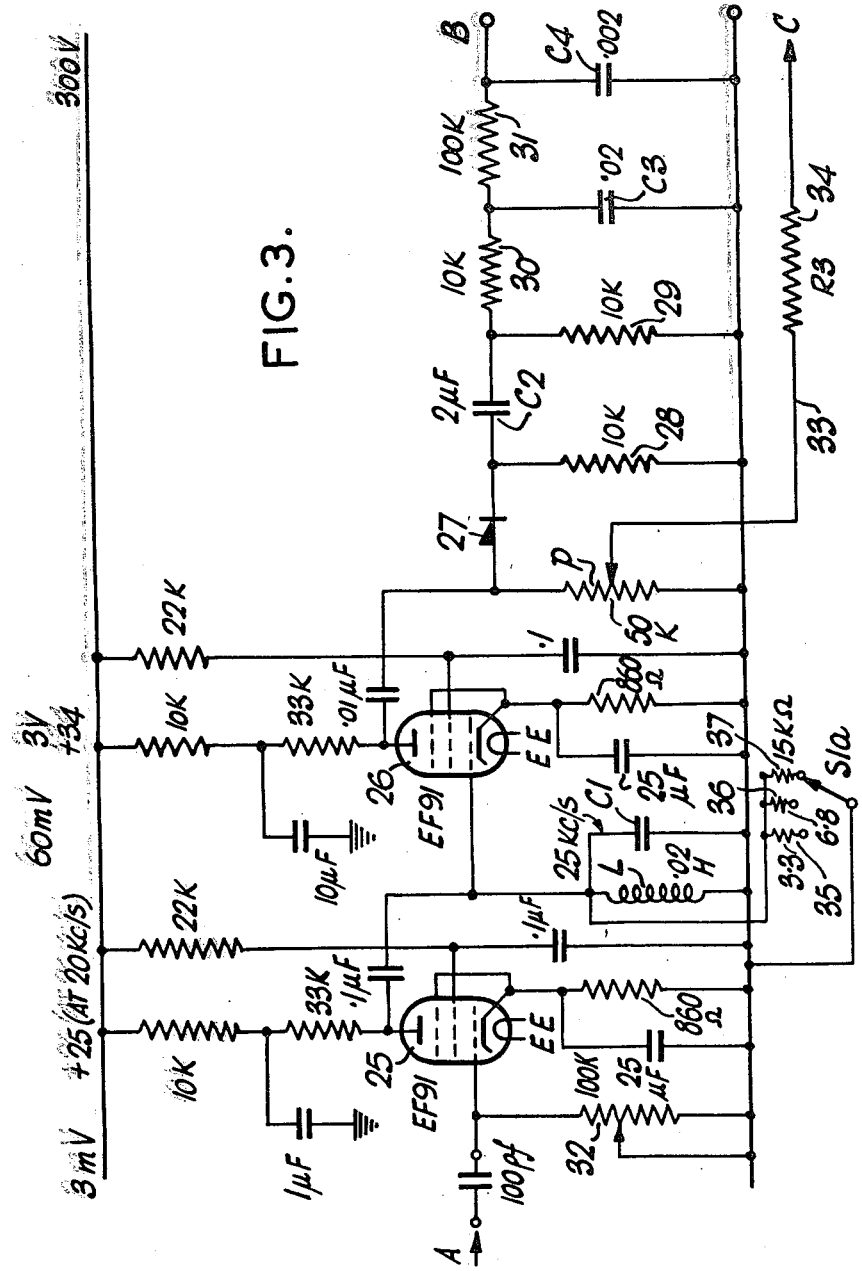

3,135,942
FREQUENCY-MODULATION ECHO-SOUNDER
David Gordon Tucker and Leslie Kay, Birmingham, England, assignors to National Research Development Corporation, London, England, a British corporation
Filed May 11, 1960, Ser. No. 28,317
Claims priority, application Great Britain May 12, 1959
9 Claims. (Cl. 340—3)

Fish swimming close to the sea-bed are very difficult to detect by conventional echo-sounding or echo-ranging devices because the echo returns from the fish are almost indistinguishable from the sea-bed returns in the case of echo-ranging, and variations in the depth of water, irregularities of the sea-bed and the vertical motion of the ship restrict the degree of resolution which can be obtained in the region of the sea-bed on an echo-sounding recorder.

The present invention is designed to present echoes from fish very near the sea-bed as clearly discernible from the sea-bed echo. The equipment may be designed to to detect fish within 2 or 3 fathoms of the sea-bed, and the presentation may be aural, thus using a sense not normally exercised while fishing.

Known echo sounders use the instant of transmission as the datum from which the echo time is measured to give an indication of depth. In deep water, up to say 300 fathoms, variations in depth are usually only a very small fraction of the total depth, and 2 or 3 fathoms change in depth are hardly noticeable on a record. Fish within a few feet of the bottom will not be detectable unless the region near the sea-bed is displayed on an expanded scale, but to do so is difficult because the depth may vary by very much more than the scale covered on the recorder. Devices which lock the datum of the display to the bottom echo are known and enable the display to be expanded without reference to depth variations. The present invention is concerned with a new approach to the problem, enabling fish near the bottom to be detected and located in a relatively simple manner.

According to this invention, an apparatus for detecting the presence of fish near the sea-bed comprises means for transmitting a frequency-modulated exploring signal, means for detecting echo signals received from the sea-bed and objects separate from and within a given distance from the sea-bed and means for setting up beat signals between said echo signals to provide an indication of the presence of a reflecting object, other than the sea-bed within said given distances. Means are preferably provided for rendering said beat signals audible to give an indication of the distance from the sea-bed of the reflecting objects by reference to the frequency of said beat signals. The equipment may also be arranged to provide a beat signal between the bottom echo signal and the transmitter signal to give an indication of depth by reference to the frequency of this beat signal, and this signal may also be made audible.

The invention will be more clearly understood from the following description of an embodiment thereof given with reference to the accompanying drawings in which:

FIGURE 1 is a block schematic diagram of a complete system according to the invention, FIGURE 2 is a graph used in explaining the operation of the system and FIGURE 3 is a detailed circuit diagram of part of the system of FIG. 1.

Referring first to FIGURE 1, it will be seen that the transmitter consists of a frequency-swept oscillator 1 controlled by a saw-tooth generator 2, and a power amplifier 3 which drives the electro-acoustic transducer 4 to produce ultrasonic waves in the water. The frequency of transmission is shown (as a typical example) to vary from 340 kc./s. to 460 kc./s. in periods of 1 second, 0.5 second or 0.25 second intervals for depths of 60 fathoms, 30 fathoms and 15 fathoms respectively. (It will be seen later that the wide band and long duration of sweep is used to give an almost continuous audible note when an echo is present.) For deeper water, a lower frequency of transmission would be used with a correspondingly slower frequency sweep rate. The transmitting transducer will be mounted in a typical system on the keel of the ship looking downwards. The transducer may, for example produce as "acoustic" beam of of the order of 3° width. Since the transmission is continuous, only a low power is required as compared with a pulse system.

A receiving transducer 5 will be mounted near the transmitting transducer and receive more-or-less continuous signals from reflecting objects at any depth. Modulating these input signals to the receiver with the direct signal from the F.M. oscillator, a sum and a difference frequency corresponding to each input signal will be obtained at the output of the frequency changer 6.

FIGURE 2 is a diagram of frequency versus time, curve (a) being the transmitted signal, curve (b) the bottom echo signal and curve (c) the signal due to, say, a fish shoal near the bottom. From FIGURE 2 it will be clear that each difference frequency output from 6 is proportional to the depth from which that signal was reflected back to the transducer. Only these difference signals are used in the system; the sum signals are rejected by the band-pass filter 7.

Since the intensity of the received sound waves decreases with depth, an equalizer 8 and amplifier 9 are used following filters 7 to correct for the fall in amplitude with increasing frequency at the output of the frequency changer.

Because the system is being used as an echo-sounder the dominant echo will be that from the sea-bed, and this will be very much greater in amplitude than any other echo. Short range echoes may be stopped if necessary by the filter 7. The difference signals which may be termed primary beat signals are applied to a detector (or rectifier) 10, the output from which will be a pulsating D.C. signal that may be regarded as being composed of not only a D.C. due to the rectified bottom-echo signal (and the latter signal itself, and its harmonics, if only a simple rectifier circuit is used), but also low frequency secondary beat signals produced by the beating together of the bottom-echo signal and any other echo signal arising, e.g., from a fish or fish shoal near the sea-bottom. Filter 11 is designed to reject the D.C. and the higher frequencies referred to above, and has its pass-band chosen so that only the low-frequency secondary beat signals derived from echo-signals arising originally in the sea immediately above the bottom (say within a range of 2 or 3 fathoms above the bottom) are passed to the next stage. The bottom echo is thus used as a carrier in operating the detector.

The important effect is that now the bottom echo, no matter what the depth, is a D.C. signal and becomes the datum to which the low-frequency secondary beat signals must be referred. Hence variations in the depth and vertical movement of a ship are eliminated because the system output is "locked" to the sea-bed. This is due to the fact that vertical movement of the ship causes alteration of the primary beat signals from the sea-bed and from other reflecting sources by equal amounts and hence no alteration in the resulting secondary beat signal.

The filter 11 is used to stop the D.C. and in this example all signals above 700 c./s. which corresponds to 2 fathoms. A wider filter band would obviously cover a greater range of depths above the sea-bed.

For ease of presentation the output of the filter 11 is frequency changed in mixer 12, fed with 1 kc./s. from the local oscillator 13, to 1040–1700 c./s. which is within the optimum audible range of the ear, and is applied through filter 14 and amplifier 15 to loudspeaker 16.

Any echo signal which originates in the two fathoms just above the sea-bed will appear in the output loudspeaker—or headphones—as a more-or-less constant tone. There will be no background as in an ordinary echo-ranging device, since all signals except the required secondary beat signals have been eliminated by filters 7, 11 and 14 and thus the tones will be clearly audible and immediately indicate the presence of fish, the pitch of the tone giving an indication of the depth of the fish; the higher the frequency the further from the bottom are the fish.

The audio amplifier 15 can be connected to the output from amplifier 9, by reversing switch 17, to obtain a tone indicative of the depth to the bottom. At the same time a change in the band of frequency would have to be made in order that the bottom echo was audible (say 5–8 kc./s.).

This is effected in mixer 18 to which is applied a signal from oscillator 19 which may, if desired, take the form of a beat frequency oscillator, the output of which may be adjusted to bring the mixer output to zero frequency if an accurate measure of the bottom sounding is required. A band pass filter 24 eliminates unwanted frequencies which might lead to ambiguity in the depth measurement. Instead of, or in addition to the audible presentation by loudspeaker 16, the signal from filter 14 may be passed through a spectrum analyser 20 to a visual display on a cathode ray tube and/or a recorder indicated by 21. Similarly, the bottom sounding signal from amplifier 9 can be applied through spectrum analyser 22 to a visual display or recorder 23.

FIGURE 3 shows in detail a circuit suitable for performing the functions of the depth equalizer 8, the amplifier 9, the detector 10 and the band-pass filter 11. The signal from the filter 7 is applied to the grid of amplifier valve 25, the output from which is applied to a tuned circuit, consisting of coil L and condenser $C_1$. The voltage across this circuit is applied to the control grid of amplifier valve 26. The output from amplifier 26 is fed to a rectifier 27 which works into a load resistor 28, the signal developed across which is fed into the band-pass filter consisting of series capacitor $C_2$, and series resistors 30 and 31, parallel capacitors $C_3$ and $C_4$ and parallel resistors 28 and 29 to provide a signal output at B. The output from B is frequency changed in the manner described above and applied to the loud-speaker 16. The input to valve 25 can be controlled by variable resistor 32. The falling off of amplitude with increasing depth is compensated by the variation of impedance with frequency of the tuned circuit $LC_1$. Thus, as the range increases the difference signal from filter 7 increases in frequency, but decreases in amplitude owing to the attenuation of the echo signal. This is offset by the increasing gain of the amplifier 26 with increasing frequency, secured by the impedance characteristic of its input circuit $LC_1$. The output from tube 26 besides being fed into the detector 27 is fed via the tapping on potentiometer P over line 33 and resistor 34 to mixer 18 as above described.

The switch $S_{1A}$ selects the appropriate one of three resistors 35, 36 and 37 to be connected as damping for the tuned circuit $LC_1$, so as to match the characteristic of the circuit to the range/frequency characteristic of the echo sounder. It can therefore be ganged to a switch controlling the setting of the sweep generator 2, which controls the frequency sweep of the transmittter, so as to adapt the system for operation over the three different depth ranges referred to above.

We claim:

1. Apparatus for detecting the presence of objects near the sea-bed comprising means for transmitting an ultrasonic signal, means for sweeping the frequency of said ultrasonic signal through a range of frequencies, means for receiving echo signals, heterodyning means for heterodyning said echo signals and the transmitted signal to provide a beat signal representing by its frequency the delay between the transmission of a given signal and reception of the corresponding echo signal, heterodyning means for heterodyning the beat signals corresponding to echoes from the sea-bed and the beat signals corresponding to echoes from any other object within a given range of the sea-bed to provide a secondary beat signal and indicating means responsive to the presence of said secondary beat signal for indicating the presence of a reflecting object other than the sea-bed within said range.

2. Apparatus as claimed in claim 1 wherein said indicating means includes means for converting said secondary beat signal to a frequency within the audible range and means for rendering the converted signal audible.

3. Apparatus as claimed in claim 1 including means for selecting the beat signal derived from the echo from the sea-bed and providing an indication of its frequency to give a measure of the sea depth.

4. Apparatus as claimed in claim 1 including means for compensating for decreasing signal amplitude at increasing range, said means including frequency sensitive means providing increasing signal gain with increasing frequency in the signal path between said receiving means and said heterodyning means which provides said secondary beat signal.

5. Apparatus as claimed in claim 1 wherein said indicating means includes a spectrum analyzer and visual display means.

6. Apparatus as claimed in claim 1 wherein said indicating means includes a spectrum analyzer and visual recording means.

7. Apparatus for detecting the presence of objects near the sea-bed comprising means for transmitting an ultrasonic signal, means for frequency-modulating said signal through a range of frequencies, means for receiving echo signals, means for heterodyning said echo signals with the transmitted signal to provide beat signals the frequencies of which represent the delay between the transmission of a given signal and reception of the corresponding echo signal, detector means to which said beat signals are applied to derive secondary beat signals the frequencies of which are determined by the frequency difference between the beat signals corresponding to echoes from the sea-bed and beat signals corresponding to echoes from any other object within a given range from the sea-bed, and means for indicating the presence of said secondary beat signals.

8. Apparatus as claimed in claim 7 in which said frequency-modulating means provides a linear sawtooth frequency sweep.

9. Apparatus for detecting the presence of further objects separate from and within a given distance from a first object comprising means for transmitting a frequency-modulated exploring signal, means for detecting echo signals received from said first object and said further objects, means for heterodyning detected echo signals from said first object with detected echo signals from said further objects to produce a beat signal, and means for indicating the presence of a said beat signal, whereby information is provided as to the presence of any further objects within said given distance.

References Cited in the file of this patent

UNITED STATES PATENTS

| | | |
|---|---|---|
| 2,206,896 | Higgins et al. | July 9, 1940 |
| 2,413,620 | Guanella | Dec. 31, 1946 |
| 2,638,586 | Guanella | May 12, 1953 |
| 2,724,817 | Hisserich | Nov. 22, 1955 |
| 2,977,568 | Roshon et al. | Mar. 28, 1961 |